United States Patent Office 2,753,381
Patented July 3, 1956

2,753,381
N-ACYL PYRROLIDINES AS SELECTIVE SOLVENTS

William T. Nelson, Bartlesville, Okla., assignor to Phillips Petroleum Company, a corporation of Delaware No Drawing. Application December 18, 1953, Serial No. 399,163

11 Claims. (Cl. 260—666)

This invention relates to the selective extraction of a hydrocarbon from a mixture containing the same. In one aspect, the invention relates to the separation of different hydrocarbons having close boiling points, for example, it relates to the separation of normally liquid, unsaturated hydrocarbons from normally liquid, less unsaturated hydrocarbons. The invention also relates to a class of compounds which are selective solvents novel for the purpose of removing a normally liquid, unsaturated hydrocarbon from a normally liquid, less unsaturated hydrocarbon containing the same. The invention also relates to a method for the storage of liquid unsaturated hydrocarbons.

I have now found that N-acyl derivatives of pyrrolidine are effective solvents for the selective separation of hydrocarbons having different degrees of saturation, especially hydrocarbons having similar boiling points. Also, the solvents of my invention are effective selective solvents for the separation of naphthene hydrocarbons from paraffin hydrocarbons and aromatic hydrocarbons from naphthene and paraffin hydrocarbons. N-acyl derivatives of pyrrolidine, such as N-formylpyrrolidine, N-acetylpyrrolidine, N-propionylpyrrolidine, and the like, are solvents suited to the objects accomplished by the present invention.

Thus, in the various processes of converting hydrocarbons, there will frequently be formed mixtures which contain some or all types of hydrocarbons, such as paraffin, cycloparaffin, olefin, diolefin, acetylene and aromatic hydrocarbons. Such materials usually can be separated by fractional distillation into close boiling fractions consisting essentially of hydrocarbons of differing types, but the further separation of such fractions to obtain reasonably pure hydrocarbons is often very difficult to accomplish by conventional fractionation processes. Various methods have been proposed for effecting the separation of hydrocarbons which have boiling points which are close together. Of the proposed methods, the most practical from the viewpoint of large scale operation are those which involve contacting the mixture of hydrocarbons with a solvent in which certain hydrocarbons are preferentially or selectively dissolved.

N-acylpyrrolidines which can be employed, according to this invention, have the following formula:

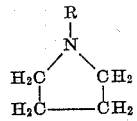

wherein R is an acyl group containing not more than three carbon atoms. Particular N-acylpyrrolidines which can be used in the practice of this invention include N-formylpyrrolidine, N-acetylpyrrolidine, N-propionylpyrrolidine, and the like.

Data showing the selectively of N-formylpyrrolidine for benzene over n-heptane and for cyclohexane over n-heptane are given in Table I. These data were determined at one atmosphere pressure and the temperatures indicated. The extract phase in the benzene-n-heptane-N-formylpyrrolidine system comprised 83.8 volume per cent of the mixture and the raffinate phase comprised 16.2 volume per cent. In the cyclohexane-n-heptane-N-formylpyrrolidine system, the extract phase comprised 69.0 volume per cent and the raffinate phase 31.0 volume per cent of the mixture. In Table I, K is the ratio of the concentration of the hydrocarbon component in the extract phase to the concentration of the same component in the raffinate phase and $K_R$ is the value of K relative to n-heptane. The critical solution temperature of n-heptane in a 50 volume per cent mixture of n-heptane and N-formylpyrrolidine is in excess of 54° C.

Table I

| | Charge, Vol. Percent | Extract, Vol. Percent | Raffinate, Vol. Percent | K | $K_R$ |
|---|---|---|---|---|---|
| $t = -15°$ C.: | | | | | |
| Benzene | 25.0 | 27.2 | 13.8 | 1.97 | 12.3 |
| n-Heptane | 25.0 | 13.4 | 84.7 | 0.16 | 1.0 |
| N-Formylpyrrolidine | 50.0 | 59.4 | 1.5 | | |
| | 100.0 | 100.0 | 100.0 | | |
| $t = 23.5°$ C.: | | | | | |
| Cyclohexane | 25.0 | 18.2 | 40.0 | 0.455 | 1.50 |
| n-Heptane | 25.0 | 14.7 | 48.4 | 0.304 | 1.00 |
| N-Formylpyrrolidine | 50.0 | 67.1 | 11.6 | | |
| | 100.0 | 100.0 | 100.0 | | |

The novel solvents of my invention posses physical properties which make them very useful as solvents for normally liquid unsaturated hydrocarbons. Some of these properties are given in Table II. Also, these compounds are fairly thermally stable when heated and polymer or resin information does not occur.

Table II

| Solvent | N-Formyl-Pyrrolidine | N-Acetyl-Pyrrolidine |
|---|---|---|
| Molecular weight | 99.13 | 113.16. |
| Boiling Point, ° C.: | | |
| Literature | | 90–93 (5 mm.) |
| Experimental | 211–212 (748 mm.) | 218–221 (745 mm.). |
| Melting Point, ° C | −22 to −26 | − 22 to −26. |
| Density (20 C) | 1.0407 | 1.0211. |
| Molecular refractivity | 27.07 | 31.18. |
| Refractive index $n^{20}$ | 1.4800 | 1.4756. |

Thus, according to the invention, naphthenes such as cyclopentane, cyclobutane, methylcyclopentane, ethylcyclopentane, methylcyclohexane, ethylcyclohexane, cycloheptane, and the like can be separated from paraffin hydrocarbons, for example, cyclohexane can be separated from 2,2-dimethylpentane, etc.; aromatics, such as toluene, ethylbenzene, xylenes, isopropylbenzene, t-butyl benzene, and the like can be separated from naphthenes and paraffins, for example, benzene can be separated from cyclohexane; and olefins such as ethylene, propylene, butylene, and the like can be separated from paraffins, for example, ethylene from ethane.

The invention is effectuated by contacting a mixture of the hydrocarbons to be separated with a N-acylpyrrolidine under extraction conditions so as to obtain an extract phase from which the extracted hydrocarbon is recovered, according to practices well known in the art. The solvent extraction methods and apparatus of the art can be employed to carry out the present invention.

Reasonable variation and modification are possible within the scope of the foregoing disclosure and the appended claims to the invention, the essence of which is (1) a novel method for the extraction or absorption of one type of hydrocarbon from a hydrocarbon of a different type, for example, an unsaturated, normally liquid hydrocarbon from a less unsaturated, normally liquid hydrocarbon, (2) a class of compounds which are selective solvents novel for this purpose, or for preparing solutions of said hydrocarbons which can be stored and (3) that the said class of compounds are N-acylpyrrolidines which can be represented by the general formula given herein.

I claim:

1. A method of selectively absorbing an unsaturated, normally liquid hydrocarbon from a less unsaturated, normally liquid hydrocarbon which comprises contacting said hydrocarbons with an N-acylpyrrolidine.

2. The selective separation of a naphthene from a paraffin which comprises contacting a mixture containing the same with an N-acylpyrrolidine.

3. The selective separation of an aromatic hydrocarbon from a less unsaturated hydrocarbon which comprises contacting a mixture containing said hydrocarbons with an N-acylpyrrolidine.

4. A selective separation according to claim 3 wherein the less unsaturated hydrocarbon is a naphthene hydrocarbon.

5. The selective separation of benzene from cyclohexane which comprises contacting a mixture containing said hydrocarbon with an N-acylpyrrolidine.

6. A method of selectively absorbing an unsaturated, normally liquid hydrocarbon from a less unsaturated, normally liquid hydrocarbon which comprises contacting said hydrocarbons with an N-acylpyrrolidine which can be represented by the following formula:

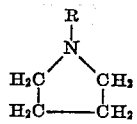

wherein R is an acyl group containing not more than 3 carbon atoms.

7. The selective separation of cyclohexane and normal heptane which comprises contacting said compounds with an N-acylpyrrolidine which can be represented by the formula:

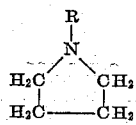

wherein R is an acyl group containing not more than 3 carbon atoms.

8. The selective separation of claim 7 wherein said N-acylpyrrolidine is N-formylpyrrolidine.

9. The selective separation of benzene and N-heptane which comprises contacting said compounds with an N-acylpyrrolidine which can be represented by the formula:

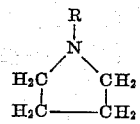

wherein R is an acyl group containing not more than 3 carbon atoms.

10. The selective separation of claim 9 wherein said N-acylpyrrolidine is N-formylpyrrolidine.

11. A method for storing a normally liquid unsaturated hydrocarbon which comprises dissolving said hydrocarbon in at least one of the compounds having the formula

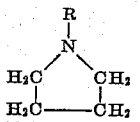

wherein R is an acyl group containing not more than 3 carbon atoms.

References Cited in the file of this patent
UNITED STATES PATENTS 2,670,810   Dorsey _____ Mar. 2, 1954